United States Patent [19]

O'Hare

[11] 3,971,938

[45] July 27, 1976

[54] METHOD OF GENERATING ELECTRICITY FROM RADIANT ENERGY CALLED VARIABLE POLARIZABILITY CAPACITY GENERATOR

[76] Inventor: Louis Richard O'Hare, 1818 Marlborough Court, Fort Collins, Colo. 80521

[22] Filed: Mar. 5, 1973

[21] Appl. No.: 338,088

[52] U.S. Cl. ............................ 250/336; 250/211 R; 310/5
[51] Int. Cl.² .......................................... G01T 1/00
[58] Field of Search ............... 250/211 R, 336, 338, 250/370, 371, 374, 388; 310/5, 10

[56] References Cited
UNITED STATES PATENTS

| | | | |
|---|---|---|---|
| 2,696,564 | 12/1954 | Ohmart | 250/388 |
| 2,909,663 | 10/1959 | McFarlane et al. | 250/374 |
| 3,229,106 | 1/1966 | De Lord et al. | 250/370 X |
| 3,300,644 | 1/1967 | Zemel et al. | 250/211 R |
| 3,426,209 | 2/1969 | Sihvonen et al. | 250/211 R |
| 3,508,053 | 4/1970 | Dimeff | 250/338 X |
| 3,524,984 | 8/1970 | Fothergill et al. | 250/336 |
| 3,603,793 | 9/1971 | Warren | 250/336 |
| 3,657,644 | 4/1972 | Beam et al. | 250/338 |
| 3,745,357 | 7/1973 | Been | 250/336 |

*Primary Examiner*—Archie R. Borchelt

[57] ABSTRACT

The elecric capacitance of a condenser changes when electromagnetic radiation reacts with the dielectric material of the condenser causing an increase in dielectric constant of unique dielectric material. This increase is due to electron polarization increase caused by the action of radiation raising electrons to excited states where electronic polarizability is greater. A subsequent removal of radiation causes a return of the electrons in the condenser's dielectric to ground state and a consequent decrease in dielectric constant. Repeating the cycles of radiation and removal of radiation produces continually changing capacitance in a condenser and when this condenser is placed in series electric circuitry with another condenser, on which a high voltage is maintained, and a transformer then an A.C. current is caused to flow through the transformer enabling useful electric work to be done by appropriate electric connections to the secondary windings of the transformer.

9 Claims, 3 Drawing Figures

INVENTOR.

BY Louis R. O'Hare

INVENTOR.

BY Louis R. O'Hare

METHOD OF GENERATING ELECTRICITY FROM RADIANT ENERGY CALLED VARIABLE POLARIZABILITY CAPACITY GENERATOR

This is an invention which uses pulsating radiant energy to generate electricity with few moving parts.

My present invention relates to those methods of and devices for generating electricity by means of changing electrical capacitance in a sort of variable electric capacitor. It especially relates to that type of generator where the variable capacitor is in series with a fixed capacitor, on which a charge is maintained, and a load such as a transformer inducing current to a work circuit is employed. In former inventions of this type the variable capacitor was of a kind in which two opposite plates remained stationary and the capacitance between them was varied by forming a conductive medium between the plates without effecting electrical conduction with both of them. Pumping action was due to the fact that in one instance of maximum capacity of the variable condenser the charge was about equally shared between the two capacitors and in the next instance as the variable capacitor's capacity lowered for lack of conduction in the element formerly conducting and causing capacitance between the plates now that condenser's charge in that it is being held by less capacitance sees a voltage increase which moves some of the charge through the load to the fixed condenser and later again a portion of the charge moved back through the load as the capacity increased in the variable condenser by the recurring conductivity in the conductive member between the plates. Such a patent was U.S. Pat. No. 3,582,693. Accordingly, my present invention concept utilizes some of the principles exemplified formerly in that the series circuitry of a fixed and a variable capacitor are used in conjunction with an electric load and transformer but the method and apparatus for changing capacity in the variable capacitor are really quite different and unique in this invention. In accordance with the present invention, capacitance is not changed by a conductive member inserted between fixed plates of a condenser in which this member alternately loses its conductivity and regains it but capacitance of the variable condenser is changed repeatedly by effecting changes in the dielectric constant of an insulating material used as a dielectric between the plates precisely when this change in dieletric constant is effected by a change in the polarizability of the dielectric medium.

As has been mentioned in the above mentioned patent, electric charge has been pumped or moved between condensers through a load by a prior art when barium-titanate dielectric in the variable condenser was made to change in its dielectric value by means of heat but in the present concept it is not principally an orientation relation of polarized dipoles that account for the polarization of the dielectric and it is not the action of heat energy to effect that orientation relation of the polarized molecules as they are oriented in the electric field that causes the change in dielectric value of the condenser's dielectric but instead, in this case, it is the radiant energy itself, not the molecular motion of heat on dipole molecules, which produces a change not principally in polarization generally speaking, but in electronic polarization. In other words, it is the electric field action of radiant energy on the electron or bits which affects the degree these electron orbits can be distorted in one direction or another by an electric field. Electronic polarizability is a measure of the tightness or looseness with which an electron is held in its orbit. Hence, some highly polarized molecules may not be further polarizable because, while they have opposite charges on each end, their electron clouds cannot be significantly extended toward a positive pole in an electric field. My invention especially concerns the use of the contribution to dielectric constant made by electronic polarizability and then the change in dielectric constant due principally to change in electronic polarizability. Hence, when polarizability changes capacitance of a condenser can be made to change. But the action of polarized light on a solid or fluid of good polarizability such as crystals of anthracene and napthacene can cause its polarizability in a given plane to change thus effecting a capacitance change of a condenser with this fluid as its dielectric. To give an example, a loosely held electron orbits a molecule and then has its orbit become elliptical by the influence of a nearby charge. Its induced polarization gives it a certain value as a dielectric for storing a charge in the field of oppositely charged condenser plates, but when an alternating electric field parallel to the condenser plate's field is applied then that electron can spend more time in the area near the condenser's positive plate because electrons in excited quantum states are generally more polarizable. The energy exciting the electron to a higher state is that caused by the light radiation polarized in the plane perpendicular to the condenser plate's field. When that loosely held electron (now under the influence of light or ultraviolet) spends more time near the positive plate its contribution to polarizability phenomena is greater, its dielectric constant value is greater and the condenser's capacity is greater. It might be appropriate to illustrate the mechanism by means of an analogy. There is a tension whereby the electron is held to certain limits or orbiting areas. Which areas are defined by mechanisms of quantum mechanics. Other orbiting areas are available where the electron is more loosely bound but to get to these excited states of higher polarizability the electron must resonate with the alternating field of radiation and absorb energy from it. This is possible for many aromatic hydrocarbons. The application of an external field to the electron's orbit is like distorting a drum skin by pushing on it. When the drum is made to vibrate with more energy it will develop new nodes of vibration. Similarly, when vibrating radiant energy is absorbed by conjugated $\pi$ bonds as in the benzene ring and multiple benzene ring molecules the electron clouds formed by the bonds take on new modes of oscillation and nodes of vibration perpendicular to the original plane of oscillation are formed. When these nodes are polarizable and can be bent in the direction of the positive plate then the addition of vibrating energy as in the case of plane polarized light will cause an increase in overall electron polarizability. As long as light energy will change the polarizability and dielectric value of the light absorbing dielectric relative to the value of the dielectric when the light is not being applied, this dielectric change can be converted to capacitance change in the condenser to be described and the capacitance change can be used to pump an electric current. Organic dyes with short intense periods of phosphorescence are good examples of condenser dielectric for this purpose.

The principal object of my invention, then, is the utilization of electromagnetic radiation especially in the visible, ultraviolet and infra-red regions to effect a change in the electronic polarizability of a dielectric in a condenser and to use the resulting capacitance change to create a variable capacitor of constantly changing capacity which when inserted in a series electric circuit with a fixed condenser and an electric load will generate an alternating flow of current through the load. Another object of this invention is to use any concommitant changes in polarization of molecules in the dielectric medium of the variable condenser as well as accompanying orientation of dipole moments to produce further changes in dielectric constant of the dielectric in the condenser in order to cause as much of a variation as is possible on each alternation of the variable condenser's capacity.

Still another object of this invention is the employment of efficient means of shuttering the radiation into the cell in order to prevent light and radiation energy loss during the alternate light and dark periods in which capacitance is respectively decreased and increased.

And yet another object of this invention is the utilization of polarized light to effect an appropriate interaction between electron clouds of atoms or molecules and radiation as to cause an impeding of, or augmentation of, electron cloud distortion in the direction of the field in the variable condenser which impeding or augmentation of distortion will reduce or increase effective polarizability of dielectric material and thereby reduce or increase capacitance of the variable capacitor.

A description of the invention with reference to accompanying drawings follows.

Figure 1:
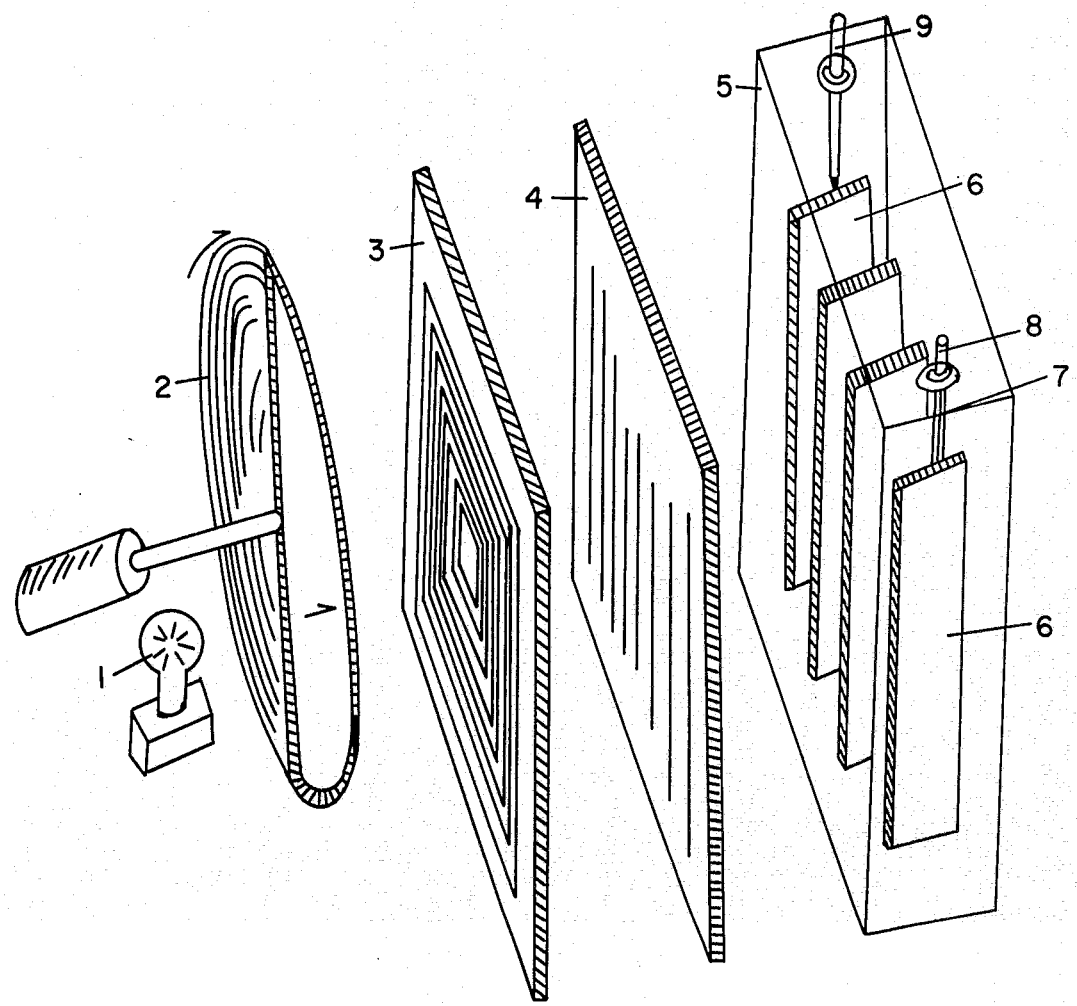
FIG. 1 illustrates a collection of objects and relative placement of these objects to achieve pulsed radiation and to produce changing capacitance.

In FIG. 1 the radiation source is represented by the picture of a light bulb, but in fact may be any source of light or radiation. It may be the focal point of a large lens or mirror focused on the sun and it is pulsed by motor driven shutter system 2 which admits pulses or bursts of radiation to collimating system 3 which may be freznel lens or appropriate other system from which radiation enters polarizer 4. After which polarized radiation enters variable condenser reactor 5 which is similar in material and construction to a Kerr cell if visible, infra-red or ultraviolet is used but which would require quartz in place of glass in the higher ultra violet regions and special crystals or metallic foils as windows to admit radiation if higher energy atomic reactor type radiation is used. Since light or radiation is used to change the electric capacitance of this condenser it can be called light-variable condenser or radiation variable condenser. In the instance in which atomic radiation such as alpha beta, gamma radiation etc. is used neither collimator 3 nor polarizer 4 are required.

The light variable condenser is composed of vertical metal plates which are enclosed in a transparent box of glass, quartz, crystal or foil depending upon the radiation to be used and filled with a fluid or a solid of high electronic polarizability as nitrobenze or carbon disulphide for light. Or in place of the fluid, crystals of transparent potassium dihydrogen phosphate, or potassium lithium niobate, lithium niobate, lithium tantalate etc, may be placed between vertical condenser plates 6 in such a manner by means of polishing and cutting that light may pass through them from left to right in a flat plane when there is no charge on the cell. That is to say the crystals should be optically polished rectangular-box shaped or some similar shape that will allow light to pass through with a flat wave front. The condenser or "light-variable" condenser terminals are depicted by 8 and 9 which allow this cell to be connected in a series electric circuit with a high voltage transformer and a fixed condenser of capacitance close to the maximum capacitance possible to the variable condenser which transformer and fixed condenser are to be shown later.

Figure 2:
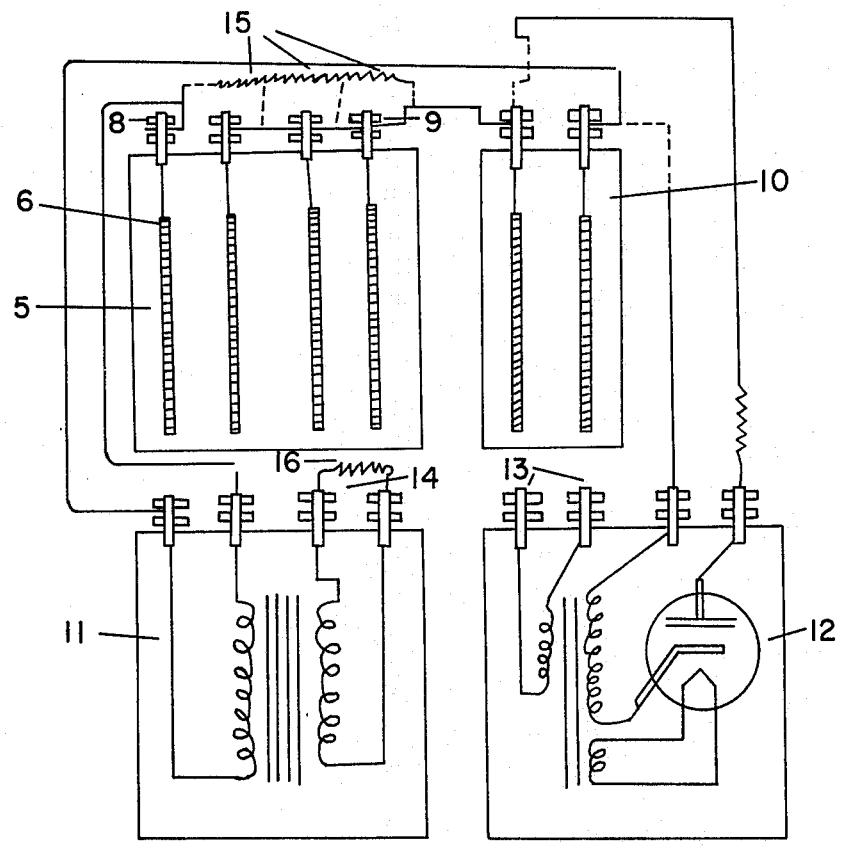
FIG. 2 shows the basic electric circuitry used to generate electricity.

FIG. 2 depicts the electric circuitry relative to the various elements. The light-variable condenser 5 already described with its vertical plates immersed in a fluid of high electronic polarizability is shown in a series circuit with condenser, fixed type, 10 of very high voltage capability of 15,000 volts or more together with very high voltage transformer 11 and an auxiliary high voltage power supply 12 used to maintain a charge on condenser 10 but which power supply is not required in continuous usage when generator is used to demonstrate its working principle. The terminals 13 are used for outside starting power but could be connected through suitable regulators to generator output terminals 14 during regular running cycle. Voltage equalizing resistors of very high resistance in the order of 20 megohms or more are used to keep the field across various segments of the condenser equal and thereby prevent undue stress on any individual segment but they are optional and depend on distance of plate separation, voltage used and dielectric strength of particular polarizability fluid or solid used. In the event highly electrically insulated plates 6 are used, as they may be, then higher voltages and shorter horizontal lengths of plates 6 may be used. With lower voltages less than 15,000 volts the spacing between plates 6 will be less than ¼ of an inch and with voltages over 40,000 k.v. spacing may be over ¼ inch or more plates must be used. For lower voltages, too, alternate plates may be connected to one terminal 8 and opposite alternate plates connected to the other terminal 9. The electric load is represented by resistor 16.

Figure 3:
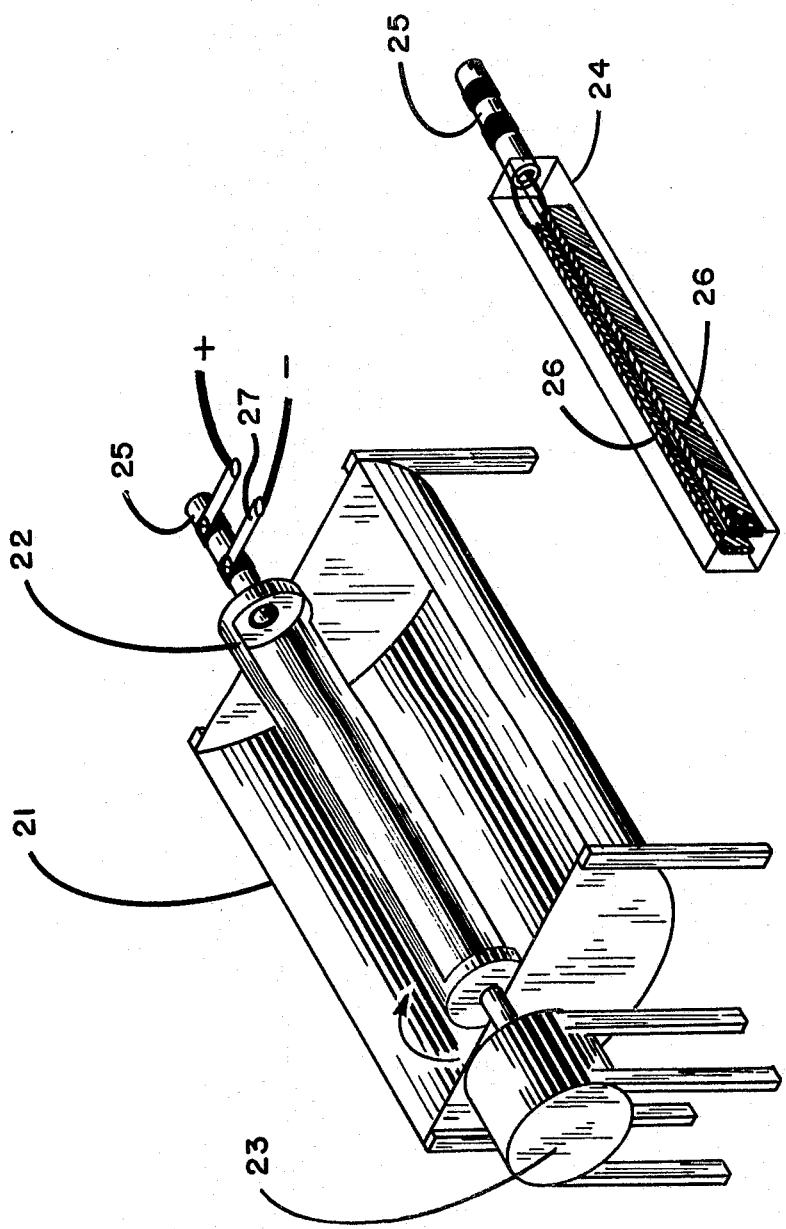
FIG. 3 shows a radiant energy collector with a pulser and a changing capacitor.

In FIG. 3 the reflective parabolic trough 21 focuses solar radiation on radiation variable dielectric through transparent box 24 and between condenser plates 26. Radiation to stationary box 24 is pulsed by rotating shutter 22, which is driven by motor 23. Electric connections to plates 26 are made by connectors 25 which are stationary and fixed to box 24. Terminals 27 carry the current from the radiation variable condenser's plates to the remainder of the electric circuitry shown in FIG. 2 but not shown in this FIG. 3.

The illustrations are not meant to set design limits to the inventive concept in the sense that a wide range of polarizers may be used such as polarizing reflective surfaces and special prisms or, in the case of other light sensitive fluids, they may not be required at all. Another example is the use of the condensing lens near the light source. Strictly speaking, any type of light energy may be used whether converging, diverging or in a flat plane and the lens could be omitted. Nor is it believed that a particular shutter design or light pulsing method would distinguish this inventive concept as such, although it might be inventive in itself. The light-variable condenser may be longer or a number placed in series.

Another embodiment of the basic inventive concept would be the use of particular fluids which are more sensitive and absorbent of light at the particular frequencies to be used. In which case, there are chemicals so reactive with radiation in the visible range, for example, as to disassociate into free radicals under the influence of light as there are others which react similarly under other forms of radiation. When, therefore, the reactants have a different electronic polarizability or orientation polarization from the products after the burst of light then again the changes in capacitance due to dielectric constant change can be used in this light sensitive condenser to generate electricity as well as the changes in polarizability of those same chemicals under the influence of bursts of light of a particular range of frequencies. Such a chemical, for instance, is hexaphenyl ethane which is responsive to visible light in the way mentioned.

In still another embodiment of the basic inventive concept vapors and gases which under the influence of light have changes in either their polarizability or orientation polarization, could be used in a modified cell with horizontally longer vertical plates for a longer light path and the containment of an adequate amount of gaseous material to achieve a significant electric capacitance by the cell. Such a gas would be $NO_2$.

Another embodiment of this basic inventive concept would be to use the generator as a demodulator if in the bursts of light intelligence were contained with regard to intensity duration of pulse or frequency since light is hereby converted to electricity any light fluctuations could be converted to electronic polarizability fluctuations and fluctuations in dielectric constant which again are converted to capacity and current flow changes.

I claim:

1. A method of generating electricity comprising:
periodically changing the dielectric constant in an electric condenser's dielectric material by causing a periodic change in the electron polarization of said dielectric by the influence of electromagnetic radiation causing an increase in electron polarization of the dielectric when this material absorbs radiation by means of intermittent interaction of said radiation with said dielectric,
employing said radiation absorbing dielectric as the dielectric material between electric condenser plates thereby effecting a variable condenser whose capacitance changes under the influence of radiation, admitting said radiation to and periodically interrupting it from said radiation variable condenser,
using the repeatedly changing capacitance of said variable condenser in a series electric circuitry with a transformer and a fixed condenser to produce a current flow in the transformer's primary winding by the periodically elevated and then depressed voltage on the plates of the variable condenser as its capacitance changes under the influence of surges of electromagnetic radiation from period to period as this radiation is admitted or impeded respectively, and
to thereby transfer useful electric energy to an electric load by the transformer's secondary winding.

2. A method of generating electricity from electromagnetic radiation as in claim 1 in which the change in the capacitance is due to a change in orientation polarization as well as to electron polarization change.

3. A method of generating electricity as in claim 1 in which the quantity of electricity generated is used as an index of radiation variation.

4. As in claim 1 when the current flow changes are used to determine radiation intensity.

5. A method of generating electricity comprising:
periodically changing the dielectric constant in an electric condenser's dielectric material by causing a periodic change in the electron polarization of said dielectric by the influence of nuclear radiation causing an increase in electron polarization of the dielectric when this material absorbs said radiation periodically by means of intermittent interaction of said radiation with said dielectric,
employing said radiation absorbing dielectric as the dielectric material between electric condenser plates thereby effecting a variable condenser whose capacitance changes under the influence of said radiation, admitting said radiation to and periodically interrupting it from said radiation variable condenser,
using the repeatedly changing capacitance of said variable capacitor in a series electric circuitry with a transformer and a fixed condenser in order to produce a current flow in the transformer's primary winding by the periodically elevated and then depressed voltage on the plates of the variable condenser as its capacitance changes under the influence of surges of nuclear radiation from period to period as this radiation is admitted to and then impeded from it respectively, thereby transferring useful electric energy to an electric load by the transformers secondary winding.

6. A method of generating electricity as in claim 2 in which the source of radiation is solar radiation and a means of focusing said radiation is employed comprising a parabolic trough at the focal point of which is said variable condenser enclosed in a fixed rectangular quartz box extending the entire length of the trough so situated with respect to electrode placement that the focused radiation falls on the said dielectric material between the electrodes and in which said means of interrupting said radiation is a cylindrical shutter rotating axially by means of a motor said shutter enclosing said quartz box but admitting the focusing light to the area between the condenser plates periodically by means of a lengthwise slit along the length of the rotating cylinder.

7. A method of generating electricity as in claim 2 in which the light reacting dielectric means comprise any of a class of aromatic hydrocarbons which have light absorbing and phosphorescent qualities.

8. A method of generating electricity as in claim 2 in which the light reacting dielectric material is polyvinyl toluene mixed with any light absorbing aromatic hydrocarbon.

9. A method of generating electricity as in claim 2 in which the dielectric material is a light absorbing gas such as nitrogen dioxide.

* * * * *